United States Patent
Fakhouri et al.

(10) Patent No.: US 9,794,136 B1
(45) Date of Patent: Oct. 17, 2017

(54) DISTRIBUTED RESOURCE ALLOCATION

(71) Applicant: Pivotal Software, Inc., Palo Alto, CA (US)

(72) Inventors: Onsi Joe Fakhouri, San Francisco, CA (US); Alex Paul Suraci, San Francisco, CA (US); Amit Kumar Gupta, San Francisco, CA (US)

(73) Assignee: Pivotal Software, Inc., San Francisco, CA (US)

( * ) Notice: Subject to any disclaimer, the term of this patent is extended or adjusted under 35 U.S.C. 154(b) by 283 days.

(21) Appl. No.: 14/601,996

(22) Filed: Jan. 21, 2015

(51) Int. Cl.
*G06F 15/173* (2006.01)
*H04L 12/24* (2006.01)
*H04L 29/08* (2006.01)

(52) U.S. Cl.
CPC .......... *H04L 41/5054* (2013.01); *H04L 67/10* (2013.01)

(58) Field of Classification Search
CPC ................... H04L 41/5054; H04L 67/10
See application file for complete search history.

(56) References Cited

U.S. PATENT DOCUMENTS

| | | | |
|---|---|---|---|
| 7,594,228 B2 | 9/2009 | Lam | |
| 7,738,504 B1 | 6/2010 | Deaner et al. | |
| 8,959,223 B2 | 2/2015 | Sloma et al. | |
| 2003/0125816 A1 | 7/2003 | Leduc et al. | |
| 2010/0257531 A1 | 10/2010 | Barsness et al. | |
| 2012/0260255 A1* | 10/2012 | Arnold | G06F 9/4881 718/102 |
| 2014/0019961 A1* | 1/2014 | Neuse | G06F 9/5088 718/1 |
| 2014/0108648 A1 | 4/2014 | Nelke et al. | |

* cited by examiner

*Primary Examiner* — Suraj Joshi
*Assistant Examiner* — Jaren M Means
(74) *Attorney, Agent, or Firm* — Fish & Richardson P.C.

(57) ABSTRACT

Methods, systems, and apparatus, including computer programs encoded on computer storage media, for allocating tasks to computing nodes using multiple resource allocators. One of the methods includes providing, by each resource allocator of a plurality of resource allocators, a first request to compute a first score to each computing node of a plurality of computing nodes, the first score representing a measure of availability for the computing node to take a particular task. A first score is received from each of the plurality of computing nodes and the nodes are ranked according to the first scores. A second request is provided to a highest-ranked computing node to compute a second score. If the difference between the first score and the second score satisfies a threshold, assigning the task to the highest-ranked computing node if and only if the difference between the first score and the second score satisfies the threshold.

21 Claims, 5 Drawing Sheets

DISTRIBUTED RESOURCE ALLOCATION

BACKGROUND

This specification relates to distributed resource allocation.

A cloud computing system is a distributed system of physical computers and software that provides developers and other users with a service that allows them to deploy and run multiple instances of applications in a computing system. Cloud computing systems may execute user-provided applications within isolated user spaces of virtual machines (VMs), commonly referred to as software containers, or containers for short. Containers provide security and improve performance by isolating the application from other applications and from other components of an underlying computing platform without incurring the overhead typically associated with launching a full virtual machine.

Allocating resources in a distributed system involves selecting a particular resource, among many resources in the distributed system, to perform a particular task.

SUMMARY

This specification describes how a distributed system can use multiple resource allocators to allocate tasks among a plurality of computing nodes in a distributed system.

In general, one innovative aspect of the subject matter described in this specification can be embodied in methods that include the actions of providing, by a first resource allocator of a plurality of resource allocators in a distributed system, a first request to compute a first score to each computing node of a plurality of computing nodes, the first score representing a measure of availability for the computing node to take a particular task; receiving, by the first resource allocator from each of the plurality of computing nodes, computed first scores; generating a ranking of the plurality of computing nodes according to the computed first scores; providing, by the first resource allocator to a highest-ranked computing node of the plurality of computing nodes, a second request to make a reservation for the particular task and to compute a second score; receiving, by the first resource allocator from the highest-ranked computing node, a computed second score; determining that a difference between the first score and the second score satisfies a threshold; and assigning the task to the highest-ranked computing node if and only if the difference between the first score and the second score satisfies the threshold. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The actions include restarting, by a resource allocator, a resource allocation process for a second task if a difference between a first score for the second task and a second score for the second task does not satisfy the threshold. Restarting the resource allocation process comprises providing, to each of the plurality of computing nodes, a request to recompute the first score for the second task. Penalizing the score if a second task having a same process identifier is already assigned to the computing node. Penalizing the score comprises adding a constant to the score when one or more tasks having a same process identifier are already assigned to the computing node. Penalizing the score comprises penalizing the score based on a number of tasks having the same process identifier that are already assigned to the computing node. The actions include distributing subsets of a plurality of tasks among the plurality of resource allocators. Each of the plurality of resource allocators is operable to request a first score from each of the plurality of computing nodes. The threshold is a predetermined ratio of the first score. The threshold is a predetermined ranking according to the second score.

Particular embodiments of the subject matter described in this specification can be implemented so as to realize one or more of the following advantages. Using multiple resource allocators that assign tasks concurrently and in parallel to computing nodes in a distributed system improves the speed at which tasks are assigned. Using multiple resource allocators provides resiliency in the face of failure of individual resource allocators. The system can use a penalty factor that encourages assigning instances of an application to different computing nodes, which improves the fault tolerance and availability of the system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
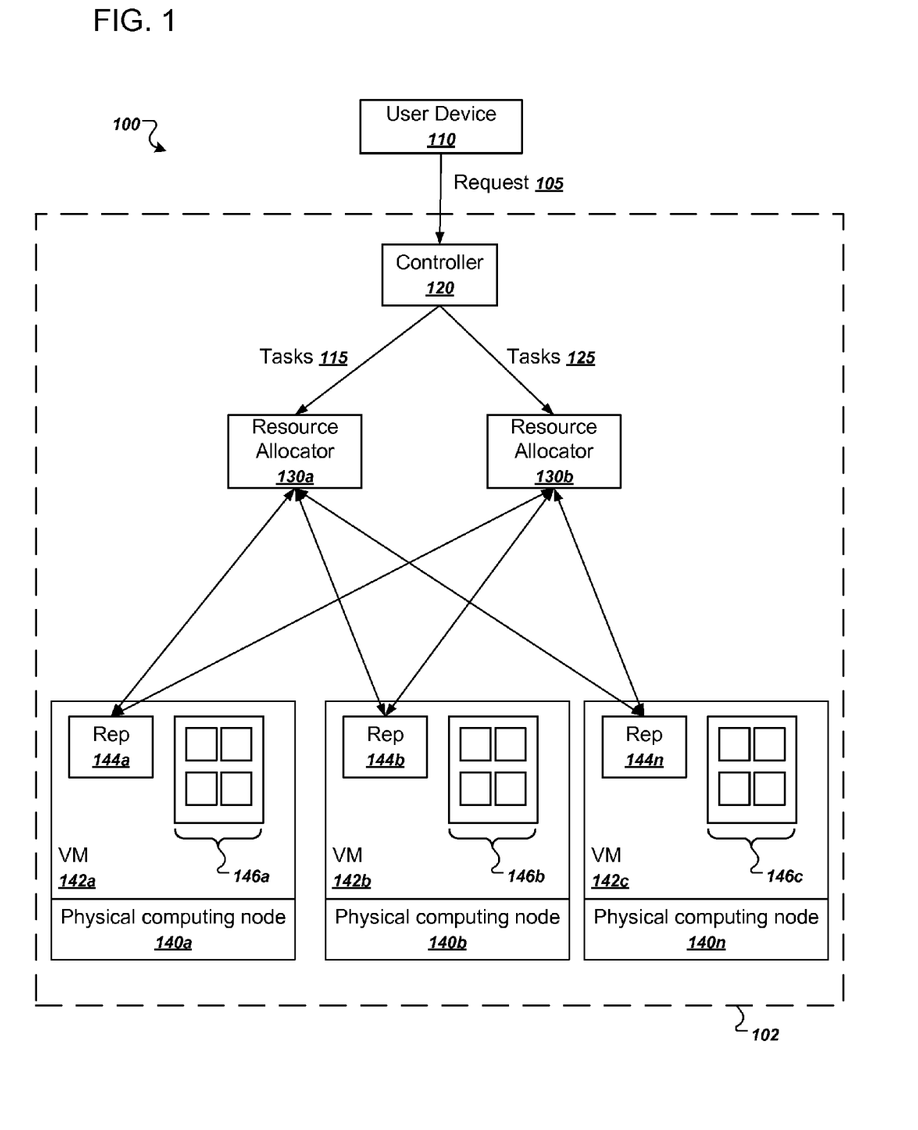
FIG. 1 is a diagram of an example system.

FIG. 1 is a diagram of an example system 100. The system 100 includes a user device 110 in communication with a distributed system 102. The distributed system 102 is an example of a system that can use distributed resource allocation to assign tasks to resources in the system 102.

The distributed system 102 includes multiple physical computing nodes 140a-n that can each perform tasks. Although only three physical computing nodes 140a-n are shown, modern cloud computing systems typically have many more computing nodes, e.g., hundreds or thousands of physical computing nodes, possibly in multiple locations. In addition, the number of available computing nodes in some distributed systems 102 may change dynamically as the demand for resources increases.

The distributed system 102 can perform tasks within containers 146a-c hosted by virtual machines 142a-c on the physical computing nodes 140a-n. Alternatively, the tasks can be performed directly on the physical computing nodes 140a-n or the virtual machines 142a-c.

A controller 120 and the resource allocators 130a-n are computing modules that can be installed on physical computers or virtual machines. The controller 120 and some of the resource allocators 130a-n may also be installed on one or more of the physical computing nodes 140a-n. Although only two resource allocators 130a-b are shown, the system 102 can include any number of resource allocators, e.g., 2, 5, 10, or 100 resource allocators.

The controller 120 uses the multiple resource allocators 130a-b to allocate resources in the system 102, e.g., the computing nodes 140a-n, by assigning respective tasks to the resources. Each task provided to a computing node is data that specifies a sequence operations to be performed by the computing node. Assigning a task to a computing node causes the computing node to perform the sequence of operations specified by the task. Each task can specify the operations to be performed by specifying an executable file, a script to be executed, or source code files to be compiled and executed, to name just a few examples. The operations to be performed can include rendering a portion of images for an animation, processing data to train a machine learning model, serving data from a distributed database, serving requests for a web application, or any other appropriate sequence of operations. The tasks can be generated by the controller 120 or another component of the system 102.

Each task can have a globally unique identifier to distinguish one task from another. Each task may also have a process identifier that identifies the operations to be performed, which may not be unique. In other words, two tasks that specify the same operations to be performed may have a same process identifier.

Tasks can be generated in response to user input. For example, a user of the user device 110 can provide a request 105 that 100 instances of an application be executed on computing nodes 140a-n of the system 102. The controller 120 receives the request 105 to execute 100 instances of the application and generates 100 corresponding tasks to be allocated to the computing nodes of the system 140a-n. In the configuration of the example system 102, each task requires the system 102 to execute an instance of the application within a container on a particular computing node 140a-n in the system.

To allocate the 100 tasks, the controller 120 initially assigns subsets of the tasks to each of the multiple resource allocators 130a-b. Each resource allocator 130a-b will then assign tasks in its subset of tasks to computing nodes in the system.

Each resource allocator 130a-b receives one or more tasks. In general, the multiple resource allocators 130a-b assign their respective tasks concurrently and in parallel to the multiple computing nodes 140a-n. The resource allocators 130a-n can employ techniques, described in more detail below, that generally result in tasks being assigned evenly and without overloading any of the particular computing nodes 140a-n.

Each resource allocator 130a-b communicates with each computing node 140a-n through respective representatives 142a-c. Each representative 142a-c is a software module. On each physical computing node 140a-n a representative is installed that, in operation, assesses the availability of the physical computing node to take on more tasks and provides a representation of that availability, e.g., a score, to the resource allocators 130a-b. In this context, availability to take on a task is a measure of the likelihood that the computing node has enough underlying resources to sufficiently execute the sequence of operations specified by the task. Thus, some computing nodes will be assessed by the node's representative as having more availability than other computing nodes because it is more likely that those computing nodes will have sufficient resources to execute the operations of the task.

The system 102 can increase and decrease the number of resource allocators dynamically, in addition to increasing and decreasing the number of computing nodes 140a-n dynamically.

Figure 2:
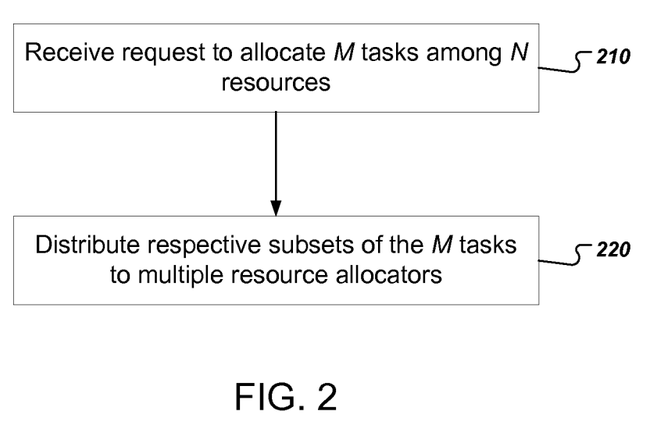
FIG. 2 is a flow chart of an example process for distributing tasks to multiple resource allocators.

FIG. 2 is a flow chart of an example process for distributing tasks to multiple resource allocators. The process will be described as being performed by an appropriately programmed controller, e.g., the controller 120 described above with reference to FIG. 1. The controller receives a request to allocate M tasks among N resources (210). In general, the resources are computing nodes that can each perform tasks.

The controller partitions the M tasks into subsets and distributes each subset to a respective one of multiple resource allocators (220). The controller can distribute the tasks to the multiple resource allocators according to any appropriate distribution. For example, the controller can distribute the tasks randomly or pseudorandomly, which may result in an unequal distribution of tasks among the multiple resource allocators.

The controller can also distribute the tasks to the resource allocators in a round-robin fashion. In other words, the controller can assign one or more tasks at a time to the resource allocators in a repeating sequence. The controller 120 can also distribute the tasks to the resource allocators according to a particular probability distribution, e.g., a uniform probability distribution. In other words, the controller 120 can obtain random or pseudorandom numbers of the M tasks and assign each random or pseudorandom number of tasks to each of the resource allocators.

Figure 3:
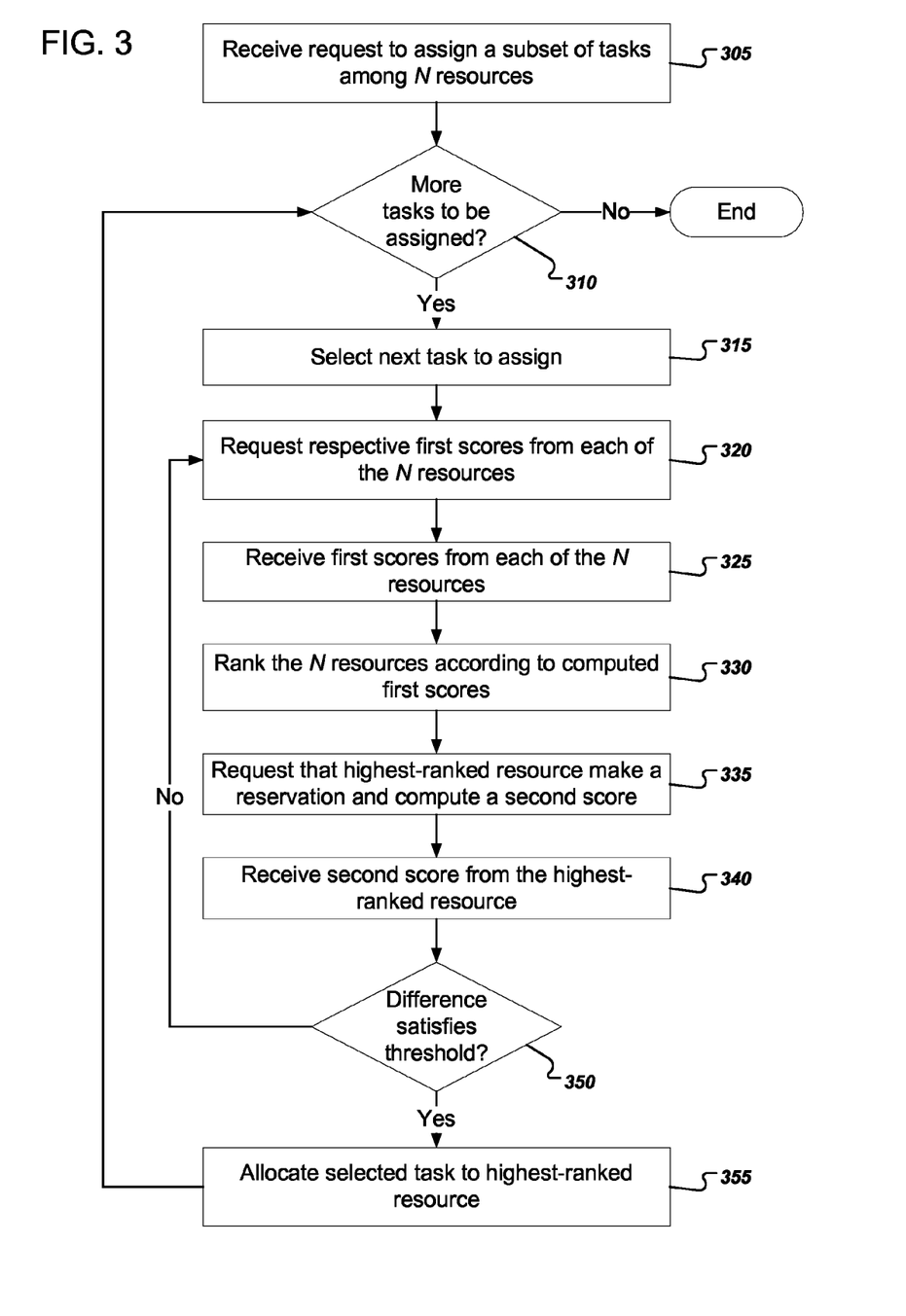
FIG. 3 is a flow chart of an example process for allocating tasks to computing nodes in a system having multiple resource allocators.

FIG. 3 is a flow chart of an example process for assigning tasks to computing nodes in a system having one or more resource allocators. In general, each of the one or more resource allocators in the system will perform the example process. The process will be described as being performed by a single resource allocator in a distributed system, e.g., one of the resource allocators 130a-b as described above with reference to FIG. 1.

The resource allocator receives a request to assign a subset of tasks among N computing nodes (305). For example, the resource allocator can receive a subset of tasks from a controller.

The resource allocator determines whether more tasks in the subset have yet to be assigned (310). The number of tasks for the resource allocator to assign can change even as the resource allocator is assigning resources from the subset of tasks. In other words, a controller of the system can continually distribute subsets of tasks to the resource allocator regardless of whether or not the resource allocator has completed assigning any particular subset of tasks.

If more tasks remain to be assigned, the resource allocator selects a next task to assign (branch to 315). The resource allocator can operate on one task at a time or on multiple tasks at a time in batches.

The resource allocator then requests respective first scores from each of the N computing nodes in the system (320). The resource allocator can provide information about the selected task in each request. For example, the request can specify a process identifier of the task as well as amounts of resources required for the selected task, e.g., an amount of desired memory, CPU, and disk utilization.

Each score represents a measure of the availability of the computing node to take the selected tasks. The score computed by each of the computing nodes can be based on underlying resource utilization of the computing node, e.g., current memory, CPU, and disk utilization of the resource. These factors may affect the availability of the computing node to take a task, and thus, these factors also influence the computed scores. Computing the score will be described in more detail below with reference to FIG. 4.

In making the requests to each of the computing nodes, each resource allocator in the system communicates with each of the N computing nodes in the system. Because of the many-to-many relationship of requests and scores being exchanged between resource allocators and computing nodes, the system can use a high performance communication system.

The resource allocator receives first scores from each of the N computing nodes (325). The resource allocator then ranks the N computing nodes according to the computed first scores (330). The resource allocator will consider the highest-ranked computing node according to the first scores to be the computing node having the best availability to take the task. Thus, the highest-ranked computing node may have the highest score or the lowest score, depending on how the scores are computed.

Some amount of time will have passed between when the highest-ranked computing node computed the first score and when the resource allocator ranks the computing nodes. In that time, other resource allocators in the system may have assigned additional tasks to the highest-ranked computing node.

Thus, before assigning the selected task to the highest-ranked resource, the resource allocator requests that the highest-ranked computing node make a reservation for the selected task and compute a second score (335). The computing node can make a reservation for the selected task by allocating necessary resources for the task, e.g., any necessary underlying memory, disk, and CPU required to perform the operations specified by the task. After allocating the resources for the selected task, the computing node computes a second score that is a second representation of the computing node's ability to take the selected task after making the reservation.

The resource allocator receives the second score from the highest-ranked computing node (340). The resource allocator then determines whether a difference between the second score and the first score satisfies a threshold (350). The difference between the second score and the first score is an indication of how much the state of the computing node has changed between a time when the first score was computed and a time when the second score was computed.

The resource allocator can determine whether the difference satisfies the threshold in a number of ways. For example, the system can define a particular threshold value for the difference between the first score and the second score. If the absolute value of the difference is greater than the threshold value, the system will consider the difference to satisfy the threshold.

The resource allocator can alternatively or in addition require the second score to be at least a particular ratio of the first score. For example, the system can determine that the difference satisfies the threshold if the second score is at least 90% of the first score.

In some implementations, the system reranks the computing nodes using the new second score for the highest-ranked computing node and determines whether the new ranking is sufficiently high. In other words, the system ranks the computing nodes using the second score computed by the highest-ranked computing node and using the first scores for all other computing nodes.

The resource allocator can then consider the difference to satisfy the threshold if the highest-ranked computing node is still highly ranked among the computing nodes, e.g., at least within the top 3, 10, or 20 computing nodes in the system, or at least within the top 3%, 10%, or 20% of the computing nodes in the system.

If the difference between the first score and the second score does not satisfy the threshold, the resource allocator effectively restarts the resource allocation process for the selected task by again requesting, from each of the N computing nodes, first scores (branch to 320). In other words, the resource allocator discards the previous results of the ranking according to the first scores and restarts the process of selecting a computing node that is most available to take the selected task.

If the difference between the first score and the second score satisfies the threshold, the resource allocator assigns the selected task to the highest-ranked computing node (branch to 355).

The resource allocator then determines whether more tasks have yet to be assigned (310). If so, the resource allocator selects a next task to assign (branch to 315), and if not, the process ends (branch to end).

Figure 4:
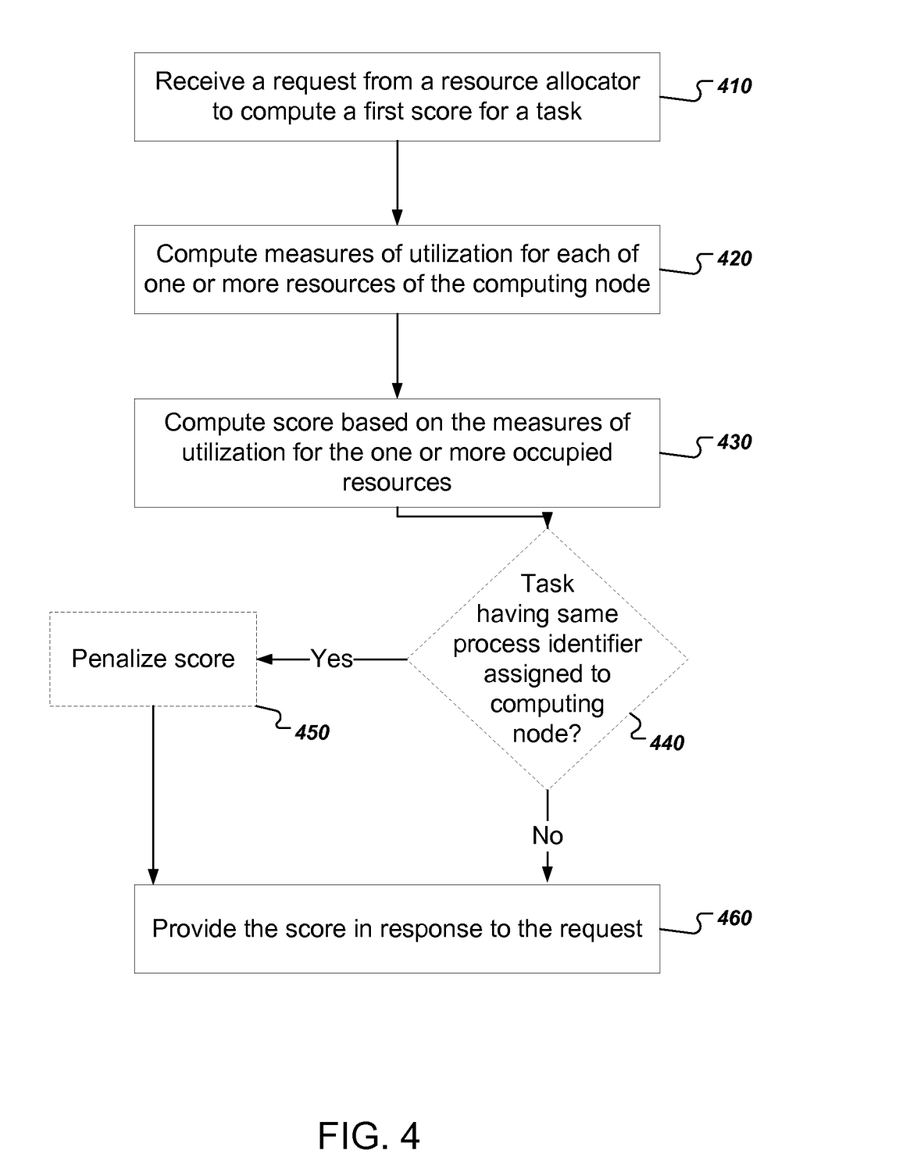
FIG. 4 is a flow chart of an example process for computing a first score in response to a request from a resource allocator.

FIG. 4 is a flow chart of an example process for computing a first score in response to a request from a resource allocator. The process will be described as being performed by a representative installed on a computing node, e.g., one of the representatives 144*a-n* as described above with reference to FIG. 1.

The representative receives a request from a resource allocator to compute a score (410). As described above, the first score represents the ability of the computing node to take the requested task.

In response, the representative computes measures of utilization for each of one or more resources on the computing node (420). Example computing node resources include containers, disk space, memory, and CPU. The computing node can compute respective measures of utilization for any appropriate combination of resources on the computing node.

For example, the computing node can compute measures of utilization including a number of containers allocated on the computing node out of a total number of available containers on the computing node, an amount of local disk space utilized on the computing node, an amount of memory utilized on the computing node, and an amount of CPU utilization. The representative can represent each of these measures of utilization as a fraction or a ratio of total availability for each resource.

The representative can then compute a score based on these measures of utilization. For example, the representative can compute a measure of central tendency of the measures of utilization, e.g. an arithmetic mean or geometric mean, a median, a mode, a minimum, or a maximum.

For example, the representative can compute a score S using measures of utilization d for disk, m for memory, and c for containers according to:

$$S = a_1 d + a_2 m + a_3 c, \tag{1}$$

where $a_1$, $a_2$, and $a_3$ are coefficients. The system can use the coefficients to compute a mean of the measures of utilization or to weight the measures of utilization differently.

The representative can optionally penalize the score if other tasks having a same process identifier are already assigned to the computing node. For example, if the process identifier of the task is an instance of a web application, the representative can penalize the score if one or more other instances of the same web application, as identified by respective process identifiers of the corresponding tasks, are already executing on the computing node.

The representative penalizing the score can act to diversify the distribution of application instances across computing nodes in the system. If one computing node should fail, the penalty applied to the score makes it less likely that a substantial number of instances of the same application are assigned to the failed computing node.

Thus, the representative optionally determines whether a task having the same process identifier is already assigned to the computing node (440). When the representative receives a request to compute a score, the request can include the process identifier of the task to be assigned. The representative can then determine whether any tasks having the same process identifier are already executing on the computing node.

If so, the representative optionally penalizes the score (branch to 450). The representative-can penalize the score in a number of ways.

For example, the representative can penalize the score using a constant value. The representative can also penalize the score based on the number of instances of tasks having the same process identifier already assigned to the computing node.

In some implementations, the representative computes a new score S' according to:

$$S'=S+\text{num}, \quad (2)$$

where S is the score computed using the measures of resource utilization and num is the number of instances tasks having the same process identifier already assigned to the computing node. In some implementations, the system can also apply the penalty factor to the score by multiplying S by num.

The representative then provides the score in response to the request (460). For example, the representative provides the score to the resource allocator that requested it.

Figure 5:
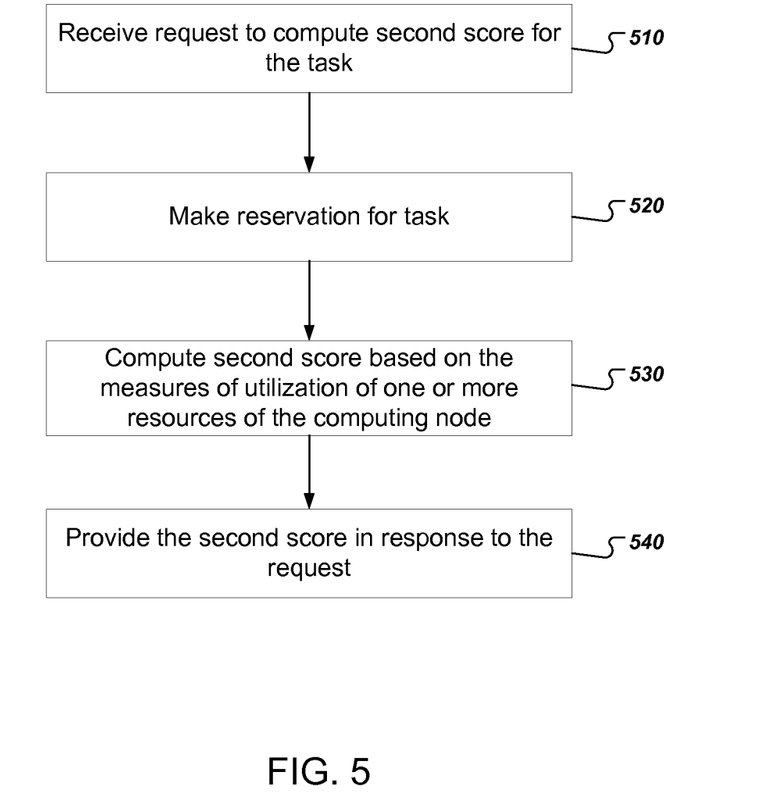
FIG. 5 is a flow chart of an example process for computing a second score in response to a request from a resource allocator.

FIG. 5 is a flow chart of an example process for computing a second score in response to a request from a resource allocator. The process will be described as being performed by a representative installed on a computing node, e.g., one of the representatives 144a-n as described above with reference to FIG. 1.

The representative receives a request to make a reservation for a task and compute a second score for the task (510). As described above with reference to FIG. 3, a resource allocator makes a request to a highest-ranked computing node according to the first scores. The representative makes a reservation for the task (520). The representative can make a reservation by allocating resources on the computing node necessary for the computing node to take the task. For example, the representative can allocate a container, memory, and disk space for the task.

The representative computes a second score based on the measures of utilization of one or more resources of the computing node (530). The representative can recompute the score after having made the reservation for the task. The representative can compute the score as described above with reference to FIG. 4, which may include the representative applying a penalty factor if other instances of the same application are already allocated to the computing node.

The representative provides the second score in response to the request (540). After providing provides the second score back to the resource allocator, the resource allocator may assign the task to the representative's computing node. The representative can then use the resources allocated by the reservation to begin execution of operations specified by the task on the computing node.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:
1. A system comprising:
one or more first physical computers and one or more storage devices storing instructions that are operable, when executed by the one or more first physical computers, to cause the one or more first physical computers to implement a plurality of computing nodes, each computing node being configured to take and perform tasks, wherein each computing node implements a respective representative configured to compute scores representing a measure of an ability of the computing node to take a particular task, the score being based on measures of utilization for one or more resources of the computing node; and one or more second physical computers and one or more storage devices storing instructions that are operable, when executed by the one or more second physical computers, to cause the one or more second physical computers to implement a plurality of resource allocators that are configured to assign tasks among the plurality of computing nodes, wherein each resource allocator is configured to perform operations comprising:

providing, to each of the plurality of computing nodes, a first request to compute a first score that represents an ability of the computing node to take a first task, receiving, from each of the plurality of computing nodes in response to the first request, a respective first score that represents an ability of the computing node to take the first task, generating a ranking of the plurality of computing nodes according to the first scores, selecting, from the ranking of the plurality of computing nodes according to the first scores, a highest-ranked computing node of the plurality of computing nodes with a first score that is higher than the first scores for the other computing nodes in the plurality of computing nodes, in response to selecting, from the ranking of the plurality of computing nodes according to the first scores, the highest-ranked computing node of the plurality of computing nodes with a first score that is higher than the scores for the other computing nodes in the plurality of computing nodes, providing, to the highest-ranked computing node of the plurality of computing nodes, a second request to make a reservation for the first task and to compute a second score that represents an ability of the highest-ranked computing node to take the first task, receiving, from the highest-ranked computing node, the second score that represents an ability of the highest-ranked computing node to take the first task, determining that a difference between the first score received from the highest-ranked computing node and the second score received from the highest-ranked computing node for the first task satisfies a threshold, in response to determining that the difference between the first score received from the highest-ranked computing node and the second score received from the highest-ranked computing node satisfies the threshold, assigning the task to the highest-ranked computing node.

2. The system of claim 1, wherein each resource allocator is configured to perform operations comprising restarting a resource allocation process for a second task if a difference between a first score for the second task and a second score for the second task does not satisfy the threshold.

3. The system of claim 2, wherein restarting the resource allocation process comprises providing, to each of the plurality of computing nodes, a request to recompute the first score for the second task.

4. The system of claim 1, wherein each representative on each computing node is configured to perform operations comprising penalizing the first score, the second score, or both, if a second task having a same process identifier as the first task is already assigned to the computing node.

5. The system of claim 4, wherein penalizing the first score, the second score, or both, comprises adding a constant to the first score, the second score, or both, when one or more tasks having a same process identifier as the first task are already assigned to the computing node.

6. The system of claim 4, wherein penalizing the first score, the second score, or both, comprises penalizing the first score, the second score, or both, based on a number of tasks having the same process identifier as the first task that are already assigned to the computing node.

7. The system of claim 1, further comprising one or more third physical computers and one or more storage devices storing instructions that are operable, when executed by the one or more third physical computers, to cause the one or more third physical computers to implement a controller that is configured to distribute subsets of a plurality of tasks among the plurality of resource allocators.

8. The system of claim 1, wherein the threshold is a predetermined ratio of the first score.

9. The system of claim 1, wherein the first scores from the plurality of computing nodes comprise the first score from highest-ranked computing node and other first scores from the other computing nodes in the plurality of computing nodes, and wherein determining that a difference between the first score received from the highest-ranked computing node and the second score received from the highest-ranked computing node for the first task satisfies the threshold comprises:

generating a second ranking of the plurality of computing nodes according to the second score and the other first scores;

determining, as the difference between the first score and the second score for the highest-ranked computing node, a change in location of the highest-ranked computing node from the ranking of the plurality of computing nodes to the second ranking of the plurality of computing nodes; and determining whether the change in location of the highest-ranked computing node from the ranking of the plurality of computing nodes to the second ranking of the plurality of computing nodes satisfies the threshold.

10. A computer-implemented method comprising:

providing, by a first resource allocator of a plurality of resource allocators in a distributed system, a first request to compute a first score to each computing node of a plurality of computing nodes, the first score representing a measure of an ability of the computing node to take a particular task;

receiving, by the first resource allocator from each of the plurality of computing nodes, a respective first score that represents an ability of the computing node to take the particular task;

generating a ranking of the plurality of computing nodes according to the first scores;

selecting, from the ranking of the plurality of computing nodes according to the first scores, a highest-ranked computing node of the plurality of computing nodes with a first score that is higher than the first scores for the other computing nodes in the plurality of computing nodes;

in response to selecting, from the ranking of the plurality of computing nodes according to the first scores, the highest-ranked computing node of the plurality of computing nodes with a first score that is higher than the first scores for the other computing nodes in the plurality of computing nodes, providing, by the first resource allocator to the highest-ranked computing node of the plurality of computing nodes, a second request to make a reservation for the particular task and to compute a second score that represents an ability of the highest-ranked computing node to take the particular task;

receiving, by the first resource allocator from the highest-ranked computing node, a computed second score that represents an ability of the highest-ranked computing node to take the particular task;

determining that a difference between the first score and received from the highest-ranked computing node the second score received from the highest-ranked computing node satisfies a threshold; and assigning the particular task to the highest-ranked computing node if and only if the difference between the first score received from the highest-ranked computing node and the second score received from the highest-ranked computing node satisfies the threshold.

11. The method of claim 10, further comprising restarting, by a resource allocator, a resource allocation process for a second task if a difference between a first score for the second task and a second score for the second task does not satisfy the threshold.

12. The method of claim 11, wherein restarting the resource allocation process comprises providing, to each of the plurality of computing nodes, a request to recompute the first score for the second task.

13. The method of claim 10, further comprising penalizing the first score, the second score, or both, if a second task having a same process identifier as the particular task is already assigned to the computing node.

14. The method of claim 13, wherein penalizing the first score, the second score, or both, comprises adding a constant to the first score, the second score, or both, when one or more tasks having a same process identifier as the particular task are already assigned to the computing node.

15. The method of claim 13, wherein penalizing the first score, the second score, or both, comprises penalizing the first score, the second score, or both, based on a number of tasks having the same process identifier as the particular task that are already assigned to the computing node.

16. The method of claim 10, further comprising distributing subsets of a plurality of tasks among the plurality of resource allocators.

17. The method of claim 10, wherein the threshold is a predetermined ratio of the first score.

18. The method of claim 10, wherein the first scores from the plurality of computing nodes comprise the first score from highest-ranked computing node and other first scores from the other computing nodes in the plurality of computing nodes; and wherein determining that a difference between the first score and received from the highest-ranked computing node the second score received from the highest-ranked computing node satisfies a threshold comprises:

generating a second ranking of the plurality of computing nodes according to the second score and the other first scores;

determining, as the difference between the first score and the second score for the highest-ranked computing node, a change in location of the highest-ranked computing node from the ranking of the plurality of computing nodes to the second ranking of the plurality of computing nodes; and determining that the change in location of the highest-ranked computing node from the ranking of the plurality of computing nodes to the second ranking of the plurality of computing nodes satisfies the threshold.

19. A computer program product, encoded on one or more non-transitory computer storage media, comprising instructions that when executed by one or more computers cause the one or more computers to perform operations comprising:

providing, by a first resource allocator of a plurality of resource allocators in a distributed system, a first request to compute a first score to each computing node of a plurality of computing nodes, the first score representing a measure of an ability of the computing node to take a particular task;

receiving, by the first resource allocator from each of the plurality of computing nodes, a respective first score that represents an ability of the computing node to take the particular task;

generating a ranking of the plurality of computing nodes according to the first scores;

selecting, from the ranking of the plurality of computing nodes according to the first scores, a highest-ranked computing node of the plurality of computing nodes with a first score that is higher than the first scores for the other computing nodes in the plurality of computing nodes:

in response to selecting, from the ranking of the plurality of computing nodes according to the first scores, the highest-ranked computing node of the plurality of computing nodes with a first score that is higher than the first scores for the other computing nodes in the plurality of computing nodes, providing, by the first resource allocator to the highest-ranked computing node of the plurality of computing nodes, a second request to make a reservation for the particular task and to compute a second score that represents an ability of the highest-ranked computing node to take the particular task;

receiving, by the first resource allocator from the highest-ranked computing node, a computed second score that represents an ability of the highest-ranked computing node to take the particular task;

determining that a difference between the first score received from the highest-ranked computing node and the second score received from the highest-ranked computing node satisfies a threshold; and assigning the particular task to the highest-ranked computing node if and only if the difference between the first score received from the highest-ranked computing node and the second score received from the highest-ranked computing node satisfies the threshold.

20. The computer program product of claim 19, the operations further comprising restarting, by a resource allocator, a resource allocation process for a second task if a difference between a first score for the second task and a second score for the second task does not satisfy the threshold.

21. The computer program product of claim 20, wherein restarting the resource allocation process comprises providing, to each of the plurality of computing nodes, a request to recompute the first score for the second task.

* * * * *

UNITED STATES PATENT AND TRADEMARK OFFICE
CERTIFICATE OF CORRECTION

PATENT NO. : 9,794,136 B1
APPLICATION NO. : 14/601996
DATED : October 17, 2017
INVENTOR(S) : Onsi Joe Fakhouri, Alex Paul Suraci and Amit Kumar Gupta It is certified that error appears in the above-identified patent and that said Letters Patent is hereby corrected as shown below:

In the Claims

Column 12, Line 62, in Claim 10: delete "nodes:" and insert --nodes;--, therefor.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*